US010638317B2

(12) United States Patent
Hamada

(10) Patent No.: US 10,638,317 B2
(45) Date of Patent: Apr. 28, 2020

(54) PROCESSING DEVICE, INFORMATION PROCESSING DEVICE, INFORMATION PROCESSING SYSTEM, PROCESSING METHOD, AND INFORMATION PROCESSING METHOD

(71) Applicant: SONY CORPORATION, Tokyo (JP)

(72) Inventor: Yu Hamada, Tokyo (JP)

(73) Assignee: SONY CORPORATION, Tokyo (JP)

(*) Notice: Subject to any disclaimer, the term of this patent is extended or adjusted under 35 U.S.C. 154(b) by 215 days.

(21) Appl. No.: 15/319,316

(22) PCT Filed: Jun. 5, 2015

(86) PCT No.: PCT/JP2015/066300
§ 371 (c)(1),
(2) Date: Dec. 15, 2016

(87) PCT Pub. No.: WO2016/009738
PCT Pub. Date: Jan. 21, 2016

(65) Prior Publication Data

US 2017/0156061 A1 Jun. 1, 2017

(30) Foreign Application Priority Data

Jul. 15, 2014 (JP) ................................ 2014-145074

(51) Int. Cl.
*H04W 12/06* (2009.01)
*H04L 29/06* (2006.01)
(Continued)

(52) U.S. Cl.
CPC ............ *H04W 12/06* (2013.01); *H04L 63/18* (2013.01); *H04W 4/00* (2013.01); *H04W 4/80* (2018.02);
(Continued)

(58) Field of Classification Search
None
See application file for complete search history.

(56) References Cited

U.S. PATENT DOCUMENTS

2010/0112944 A1 5/2010 Toshimitsu
2010/0211685 A1 8/2010 McDowall et al.
(Continued)

FOREIGN PATENT DOCUMENTS

JP 2004-247794 9/2004
JP 2008-109581 5/2008
(Continued)

OTHER PUBLICATIONS

Feb. 8, 2018, European Search Report issued for related EP application No. 15821526.9.

*Primary Examiner* — Fatoumata Traore
(74) *Attorney, Agent, or Firm* — Paratus Law Group, PLLC

(57) ABSTRACT

Provided is a processing device, including: a processing unit configured to perform an authentication process of authenticating a communication target device through communication of a first communication distance and perform a communication-based process with the authenticated communication target device through communication of a second communication distance shorter than the first communication distance.

19 Claims, 7 Drawing Sheets

(51) Int. Cl.
*H04W 84/10* (2009.01)
*H04W 4/00* (2018.01)
*H04W 4/80* (2018.01)
*H04W 76/30* (2018.01)
*H04W 76/14* (2018.01)
*H04W 8/00* (2009.01)
*H04W 12/00* (2009.01)

(52) U.S. Cl.
CPC .......... *H04W 8/005* (2013.01); *H04W 76/14* (2018.02); *H04W 76/30* (2018.02); *H04W 84/10* (2013.01); *H04W 12/00503* (2019.01)

(56) References Cited

U.S. PATENT DOCUMENTS

2010/0317289 A1* 12/2010 Desai .................. H04B 17/318 455/41.2
2011/0070834 A1* 3/2011 Griffin ................ G06K 7/0008 455/41.1
2011/0108624 A1* 5/2011 Adams ................ G06K 7/0008 235/441
2011/0306386 A1* 12/2011 Centoza ............... H04W 28/08 455/552.1
2014/0049361 A1* 2/2014 Ahearn ............. G07C 9/00309 340/5.7
2014/0229385 A1* 8/2014 Neafsey ............ G06Q 20/3674 705/67
2016/0055689 A1* 2/2016 Raina ................ G07C 9/00309 340/5.7

FOREIGN PATENT DOCUMENTS

JP 2009-135610 6/2009
JP 2011-018992 1/2011

* cited by examiner

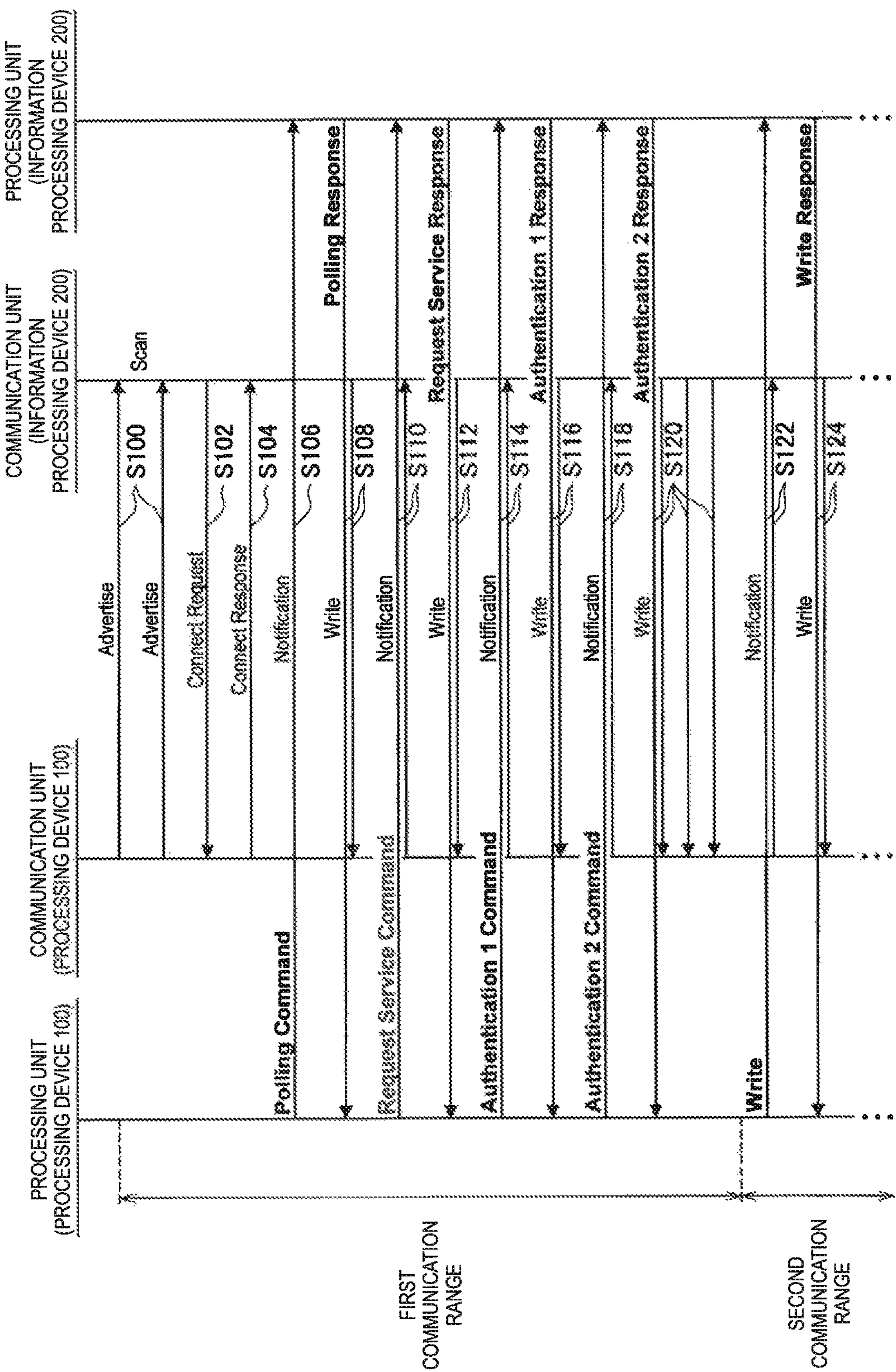
FIG.2
PROCESSING UNIT (PROCESSING DEVICE 100)
COMMUNICATION UNIT (PROCESSING DEVICE 100)
COMMUNICATION UNIT (INFORMATION PROCESSING DEVICE 200)
PROCESSING UNIT (INFORMATION PROCESSING DEVICE 200)
Scan
Advertise
S100
Advertise
Connect Request
S102
Connect Response
S104
Polling Command
Notification
S106
Polling Response
Write
S108
Request Service Command
Notification
S110
Request Service Response
Write
S112
Authentication 1 Command
Notification
S114
Authentication 1 Response
Write
S116
Authentication 2 Command
Notification
S118
Authentication 2 Response
Write
S120
Write
Notification
S122
Write Response
Write
S124
FIRST COMMUNICATION RANGE
SECOND COMMUNICATION RANGE

PROCESSING DEVICE, INFORMATION PROCESSING DEVICE, INFORMATION PROCESSING SYSTEM, PROCESSING METHOD, AND INFORMATION PROCESSING METHOD

CROSS REFERENCE TO PRIOR APPLICATION

This application is a National Stage Patent Application of PCT International Patent Application No. PCT/JP2015/066300 (filed on Jun. 5, 2015) under 35 U.S.C. § 371, which claims priority to Japanese Patent Application No. 2014-145074 (filed on Jul. 15, 2014), which are all hereby incorporated by reference in their entirety.

TECHNICAL FIELD

The present disclosure relates to a processing device, an information processing device, an information processing system, a processing method, and an information processing method.

BACKGROUND ART

A technique of switching a communication range and performing a process has been developed. As a technique of performing a connection process for performing communication through communication of a certain communication range and performing a process related to provision of a service through communication of another communication range wider than the certain communication range after the connection process is completed, a technique disclosed in, for example, Patent Literature 1 is known.

CITATION LIST

Patent Literature

Patent Literature 1: JP 2004-247794A

DISCLOSURE OF INVENTION

Technical Problem

For example, in the known technique of performing the process of switching the communication range as in the technique disclosed in Patent Literature 1, the connection process is performed between devices through communication of a certain communication range, and then a communication-based process is performed between devices through communication of another communication range wider than the certain communication range. Thus, when such a known technique is used, there is a possibility that the communication-based process can be performed between specific devices.

However, when such a known technique is used, for example, a user having an information processing device enters a narrow communication range in order to cause the information processing device to perform communication for being provided with a service, but the user is then unable to be provided with a service until the connection process is completed. For this reason, when the process of switching the communication range from the narrow communication range to the wide communication range is performed as in the known technique, since there is a possibility that it will make the user wait, convenience for the user is likely to be lowered.

The present disclosure provides a processing device, an information processing device, an information processing system, a processing method, and an information processing method, which are novel and improved and capable of improving convenience for a user.

Solution to Problem

According to the present disclosure, there is provided a processing device, including: a processing unit configured to perform an authentication process of authenticating a communication target device through communication of a first communication distance and perform a communication-based process with the authenticated communication target device through communication of a second communication distance shorter than the first communication distance.

According to the present disclosure, there is provided an information processing device, including: a processing unit configured to perform an authentication process of authenticating a processing device that performs communication of a first communication distance through the communication of the first communication distance with the processing device and perform a communication-based process with the authenticated processing device through communication of a second communication distance shorter than the first communication distance switched from the communication of the first communication distance in the processing device.

According to the present disclosure, there is provided an information processing system, including: a processing device; and an information processing device configured to perform communication with the processing device. The processing device includes a processing unit configured to perform an authentication process of authenticating the information processing device of a communication target through communication of a first communication distance and perform a communication-based process with the authenticated information processing device through communication of a second communication distance shorter than the first communication distance, and the information processing device includes a processing unit configured to perform an authentication process of authenticating the processing device through the communication of the first communication distance and perform a communication-based process with the authenticated processing device through the communication of the second communication distance switched from the communication of the first communication distance in the processing device.

According to the present disclosure, there is provided a processing method performed in a processing device, including: a step of performing an authentication process of authenticating a communication target device through communication of a first communication distance; and a step of performing a communication-based process with the authenticated communication target device through communication of a second communication distance shorter than the first communication distance.

According to the present disclosure, there is provided an information processing method performed in an information processing device, including: a step of performing an authentication process of authenticating a processing device that performs communication of a first communication distance through the communication of the first communication distance with the processing device; and a step of performing a communication-based process with the authenticated processing device through communication of a second communication distance shorter than the first communication distance switched from the communication of the first communication distance in the processing device.

According to the present disclosure, there is provided an information processing method performed in an information processing system including a processing device that performs communication of a first communication distance and an information processing device, the information processing method including: a step of performing, by the processing device and the information processing device, mutual authentication through the communication of the first communication distance; and a step of switching, by the processing device, communication from the communication of the first communication distance to communication of a second communication distance shorter than the first communication distance and performing, by the processing device and the information processing device, a communication-based process through the communication of the second communication distance.

Advantageous Effects of Invention

According to the present disclosure, convenience for a user can be improved.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is an explanatory diagram illustrating an example of a process related to an information processing method in the information processing system according to the first embodiment.

MODE(S) FOR CARRYING OUT THE INVENTION

Figure 1:
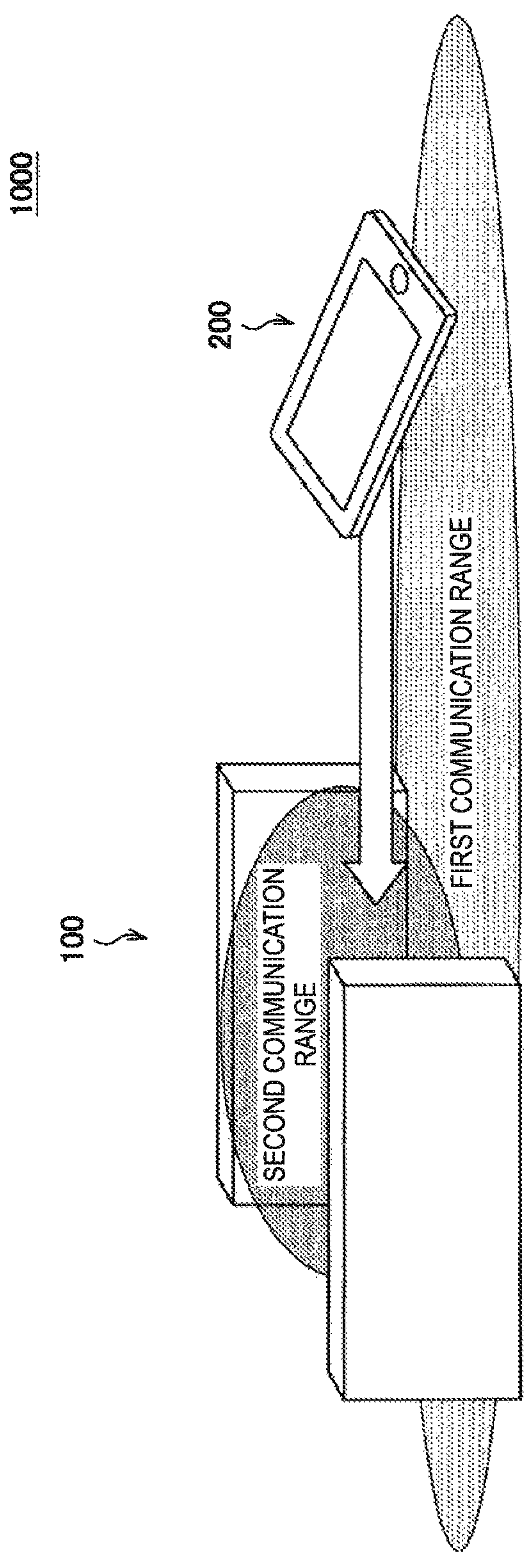
FIG. 1 is an explanatory diagram illustrating an example of an information processing system according to the first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.

1. Information processing system according to present embodiment
2. Processing device and information processing device according to present embodiment
3. Program according to present embodiment (Information Processing System According to Present Embodiment)

[1] Information Processing Method in Information Processing System According to Present Embodiment As described above, when the process of switching the communication range from the narrow communication range to the wide communication range is performed, the convenience for the user is likely to be lowered.

In this regard, in an information processing system according to the present embodiment, a processing device according to the present embodiment performs a process of performing switching from communication of a first communication distance to communication of a second communication distance smaller than the first communication distance.

Here, examples of communication according to the present embodiment include wireless communication using IEEE 802.15.1 such as Bluetooth low energy (BLE) and wireless communication using IEEE 802.11. The following description will proceed with an example in which the communication according to the present embodiment is BLE.

Examples of the communication of the first communication distance according to the present embodiment include communication having no directivity or communication having directivity in a predetermined direction.

Here, when the communication of the first communication distance is the communication having no directivity, the second communication distance is smaller than the first communication distance in an arbitrary direction in which communication is possible. Thus, when the communication of the first communication distance is the communication having no directivity, a communication range in which communication can be performed through the communication of the second communication distance is smaller than the communication range in which communication can be performed through the communication of the first communication distance. Further, when the communication of the first communication distance is the communication having no directivity; the communication range in which communication can be performed through the communication of the second communication distance is included in the communication range in which communication can be performed through the communication of the first communication distance.

Further, when the communication of the first communication distance is the communication having directivity in a predetermined direction, the first communication distance in a predetermined direction (a direction in which directivity is oriented) is different from the first communication distance in a direction other than the predetermined direction (a direction in which directivity is not oriented), but the second communication distances in the predetermined direction and the direction other than the predetermined direction are smaller than the first communication distance. In other words, even when the communication of the first communication distance is the communication having directivity in a predetermined direction, the second communication distance in an arbitrary direction in which communication is possible is smaller than the first communication distance. Thus, even when the communication of the first communication distance is the communication having directivity in a predetermined direction, the communication range in which communication can be performed through the communication of the second communication distance is smaller than the communication range in which communication can be performed through the communication of the first communication distance. Further, even when the communication of the first communication distance is the communication having directivity in a predetermined direction, the communication range in which communication can be performed through the communication of the second communication distance is included in the communication range in which communication can be performed through the communication of the first communication distance.

Thus, regardless of whether or not the communication of the first communication distance according to the present embodiment has directivity, the communication range in which communication can be performed through the communication of the second communication distance according to the present embodiment is smaller than the communication range in which communication can be performed through the communication of the first communication distance according to the present embodiment. Further, regardless of whether or not the communication of the first communication distance according to the present embodiment has directivity, the communication range in which communication can be performed through the communication of the second communication distance is included in the communication range in which communication can be performed through the communication of the first communication distance.

Hereinafter, the communication range in which communication can be performed through the communication of the first communication distance is referred to as a “first communication range,” and the communication of the first communication distance according to the present embodiment is referred to as “communication of the first communication range.” Further, hereinafter, the communication range in which communication can be performed through the communication of the second communication distance is referred to as a “second communication range,” and the communication of the second communication distance according to the present embodiment is referred to as “communication of the second communication range.”

For example, the processing device according to the present embodiment performs switching between the communication of the first communication range and the communication of the second communication range by causing a communication unit (which will be described later) with which the processing device according to the present embodiment is equipped or an external communication device connected to the processing device according to the present embodiment to switch transmission power for transmitting a signal. For example, when the communication unit (which will be described later) is desired to perform the communication of the first communication range, the processing device according to the present embodiment transfers a control signal including a transmission command for transmitting a signal at first transmission power to the communication unit (which will be described later). Further, when the communication unit (which will be described later) is desired to perform the communication of the second communication range, the processing device according to the present embodiment transfers a control signal including a transmission command for transmitting a signal at second transmission power higher than the first transmission power to the communication unit (which will be described later).

Here, when the communication unit (which will be described later) or the external communication device includes one communication module capable of transmitting a signal at a plurality of levels of transmission power, one communication module in the communication unit (which will be described later) or the external communication device transmits the signal at the transmission power according to the control signal. Further, when the communication unit (which will be described later) or the external communication device includes a plurality of communication modules that differ in transmission power for transmitting the signal, in the communication unit (which will be described later) or the external communication device, for example, the communication module corresponding to the control signal transmits the signal.

More specifically, in the information processing system according to the present embodiment, the processing device according to the present embodiment that performs the communication of the first communication range (the communication of the first communication distance) and an information processing device according to the present embodiment (corresponding to an example of a communication target device of the processing device according to the present embodiment) perform mutual authentication through the communication of the first communication range. For example, the processing device according to the present embodiment and the information processing device according to the present embodiment perform an authentication process of authenticating communication target device after establishing a connection of a BLE layer.

Further, in the information processing system according to the present embodiment, the processing device according to the present embodiment switches communication from the communication of the first communication range (the communication of the first communication distance) to the communication of the second communication range (the communication of the second communication distance), and the processing device according to the present embodiment and the information processing device according to the present embodiment perform a communication-based process through the communication of the second communication range.

Here, as the communication-based process according to the present embodiment, for example, there is a process related to entrance and exit at a gate such as a ticket gate. As the process related to entrance and exit, for example, an arbitrary process capable of implementing entrance and exit at a ticket gate or the like such as an authentication process or a payment process using an electronic value (currency or data having a value equivalent to currency) is included. Further, the communication-based process according to the present embodiment may be a process related to an arbitrary service such as a payment process related to an arbitrary payment method such as payment using an electronic value or payment using a credit card.

As described above, in the information processing system according to the present embodiment, the mutual authentication is performed between the processing device according to the present embodiment and the information processing device according to the present embodiment through the communication of the first communication range that is the larger communication range than the second communication range (the communication of the first communication distance larger than the second communication distance). Further, in the information processing system according to the present embodiment, the communication-based process is performed between the processing device according to the present embodiment and the information processing device according to the present embodiment through the communication of the second communication range that is the smaller communication range than the first communication range (the communication of the second communication distance smaller than the first communication distance).

Here, there are cases in which it takes time until the mutual authentication is completed. However, in the information processing system according to the present embodiment, since the mutual authentication is performed between the processing device according to the present embodiment and the information processing device according to the present embodiment through the communication of the first communication range that is the larger communication range, a possibility of the mutual authentication being completed by the time the communication-based process by the communication of the second communication range starts is high.

Thus, when the user that uses the information processing system according to the present embodiment and owns the information processing device according to the present embodiment moves within the second communication distance in communication of the processing device according to the present embodiment, a possibility of the user being able to be provided with a service corresponding to the communication-based process (for example, a service related to entrance and exit at a ticket gate or the like, a service related to payment, or the like) is high. In other words, when the information processing system according to the present embodiment is used, a possibility of the user being made to wait is low.

Thus, the information processing system according to the present embodiment can improve the convenience for the user.

Next, an example of the information processing system according to the present embodiment will be described together with an example of a process in the processing device according to the present embodiment that constitutes the information processing system according to the present embodiment (a process related to a processing method according to the present embodiment) and an example of a process in the information processing device according to the present embodiment that constitutes the information processing system according to the present embodiment (a process related to an information processing method according to the present embodiment).

The following description will proceed with an example in which communication according to the present embodiment is BLE, the processing device side according to the present embodiment functions as a "BLE peripheral," and the information processing device side according to the present embodiment functions as a "BLE central."

Further, the following description will proceed with an example in which the information processing system according to the present embodiment is a system that provides a service related to entrance and exit at a ticket gate, that is, the communication-based process according to the present embodiment is a process related to entrance and exit at a ticket gate.

[1] Information Processing System According to First Embodiment

FIG. 1 is an explanatory diagram illustrating an example of an information processing system 1000 according to the first embodiment. The information processing system 1000 includes, for example, a processing device 100 and an information processing device 200. FIG. 1 illustrates an example in which the processing device 100 is installed in a ticket gate. Further, FIG. 1 illustrates an example in which the information processing device 200 is a communication device such as a smart phone. In FIG. 1, for the sake of convenience, the first communication range according to the present embodiment and the second communication range according to the present embodiment are conceptually illustrated.

Next, an example of a process in the information processing system 1000 will be described using an example in which the user of the information processing device 200 who uses the information processing system 1000 moves toward the ticket gate in which the processing device 100 is installed in a state while carrying the information processing device 200.

[1-1] Process in Processing Device 100 (Process Related to Processing Method According to Present Embodiment)

When the information processing device 200 comes within the first communication distance in communication of the processing device 100, the processing device 100 performs the authentication process of authenticating the information processing device 200 (the communication target device) through the communication of the first communication range. Here, determination of whether or not the information processing device 200 is located within the first communication distance corresponds to determination of whether the communication target device is located within the first communication range.

The processing device 100 performs advertising through the communication of the first communication range, for example, using an advertisement of BLE, and detects that the information processing device 200 has come within the first communication distance when there is a response from the information processing device 200. For example, the processing device 100 may regularly perform advertising at set predetermined time intervals or may perform advertising irregularly. Further, a method of detecting the communication target device of the communication of the first communication range in the processing device 100 according to the present embodiment is not limited to the above example, and the processing device 100 can use an arbitrary method capable of detecting that the information processing device 200 has come within the first communication distance.

Here, the processing device 100 may perform the communication of the first communication range as the communication having directivity in a predetermined direction, for example, as in the first communication range of FIG. 1. As the first communication range illustrated in FIG. 1, for example, a communication range in which a distance from the processing device 100 is a maximum of about 10 [m] is used. The communication of the first communication range according to the present embodiment may be the communication having no directivity. It will be appreciated that the communication range of the communication of the first communication range according to the present embodiment is not limited to the above example.

As described above, the communication having directivity in a predetermined direction is performed as the communication of the first communication range, and thus the following effects are obtained.

The communication of the first communication range is prevented from being performed again with the information processing device 200 that has performed the communication-based process through the second communication (for example, the information processing device 200 carried by the user who has passed through the ticket gate illustrated in FIG. 1).

It is possible to suppress power consumption unnecessary for the communication of the first communication range when the communication of the first communication range is performed with the information processing device 200 or the like.

Then, the processing device 100 performs the communication-based process with the information processing device 200 (the communication target device) which is authenticated through the communication of the second communication range.

More specifically, the processing device 100 determines whether or not the information processing device 200 (the communication target device) is located within the second communication distance. Here, the determination of whether or not the information processing device 200 is located within the second communication distance corresponds to determination of whether or not the communication target device is located within the second communication range. Then, when the communication of the first communication range is performed, and the information processing device 200 is determined to be located within the second communication distance, the processing device 100 switches the communication distance from the first communication distance to the second communication distance. When the processing device 100 switches the communication distance from the first communication distance to the second communication distance, the communication is switched from the communication of the first communication range to the communication of the second communication range. The processing device 100 performs the communication-based process with the authenticated information processing device 200 through the switched communication of the second communication range.

Here, the processing device 100 determines whether or not the information processing device 200 (the communication target device) is located within the second communication distance, for example, through the following determination processes (A) to (C).

(A) First Example of Determination Process

The processing device 100 determines whether or not the information processing device 200 is located within the second communication distance based on a result of detecting a signal strength (a received signal strength indicator (RSSI)) of a signal transmitted from the information processing device 200 (the communication target device).

The processing device 100 determines the information processing device 200 to be located within the second communication distance, for example, when a value of the signal strength indicated in [dB] is larger than a set predetermined threshold value (or when the value of the signal strength is the threshold value or more; the same hereinafter). Here, a predetermined threshold value according to the present embodiment may be a fixed value which is set in advance or may be a variable value that the user (or an administrator) of the processing device 100 can vary.

For example, the signal strength may be measured in the processing device 100 or may be measured by an external device connected to the processing device 100. Further, the processing device 100 can acquire the value of the signal strength based on information (data) indicating the signal strength transmitted from the information processing device 200 (the communication target device). For example, the signal strength indicated by the information indicating the signal strength may be measured in the information processing device 200 or may be measured by the external device connected to the information processing device 200.

(B) Second Example of Determination Process

The processing device 100 determines whether or not the information processing device 200 (the communication target device) is located within the second communication distance based on a detection result of a sensor that detects an object.

Here, as a sensor according to the present embodiment, for example, an arbitrary sensor capable of detecting an object such as a human body (the user) such as an infrared sensor is used. For example, the sensor according to the present embodiment is arranged at a position at which entrance of the user (an example of an object) of the information processing device 200 into an area within the second communication distance can be detected such as a doorway portion of the ticket gate illustrated in FIG. 1. The sensor according to the present embodiment may be a sensor with which the processing device 100 is equipped or an external sensor connected to the processing device 100.

For example, when the communication of the first communication range is performed with the information processing device 200, and detection data of the sensor indicates that an object is detected, the processing device 100 determines the information processing device 200 to be located within the second communication distance.

(C) Third Example of Determination Process

The processing device 100 can perform a process in which the determination process according to the first example described in (A) is combined with the determination process according to the second example described in (B).

For example, when the value of the signal strength is larger than a predetermined threshold value, the communication of the first communication range is performed with the information processing device 200, and the detection data of the sensor indicates that an object is detected, the processing device 100 determines the information processing device 200 to be located within the second communication distance. Further, for example, when the value of the signal strength is larger than a predetermined threshold value or the communication of the first communication range is performed with the information processing device 200, and the detection data of the sensor indicates that an object is detected, the processing device 100 may determine the information processing device 200 to be located within the second communication distance.

The processing device 100 constituting the information processing system 1000 according to the first embodiment performs, for example, the above-described process as the process related to the processing method according to the present embodiment, authenticates the information processing device 200 (the communication target device) through the communication of the first communication range, switches the communication of the first communication range to the communication of the second communication range, and performs the communication-based process with the authenticated information processing device 200 through the second communication range.

Further, when the information processing system according to the first embodiment is configured to include a plurality of information processing devices according to the present embodiment, the processing device 100 performs the process related to the processing method according to the present embodiment on each of a plurality of information processing devices according to the present embodiment. When the process related to the processing method according to the present embodiment is performed on each of a plurality of information processing devices according to the present embodiment, the processing device 100 exclusively performs the process, for example, on a plurality of information processing devices according to the present embodiment.

[1-2] Process in Information Processing Device 200 (Process in Information Processing Method According to Present Embodiment)

The information processing device 200 performs the authentication process of authenticating the processing device 100 through the communication of the first communication range with the processing device 100 that performs the communication of the first communication range. The information processing device 200 detects, for example, an advertisement transmitted from the processing device 100 through the communication of the first communication range, establishes a connection of the BLE layer with the processing device 100, and performs the authentication process of authenticating the processing device 100.

Then, the information processing device 200 performs the communication-based process with the authenticated processing device 100 through the communication of the second communication range switched from the communication of the first communication range as described above in the processing device 100. The information processing device 200 receives, for example, a signal transmitted from the processing device 100 through the communication of the second communication range, performs a process according to the signal, and performs the communication-based process with the processing device 100 through the communication of the second communication range.

[1-3] Example of Process in Information Processing System 1000

In the information processing system 1000, for example, as the processing device 100 performs the process described in [1-1], and the information processing device 200 performs the process described in [1-2], the mutual authentication is performed through the communication of the first communication range, and the communication-based process is performed through the communication of the second communication range. An example of the process in the information processing system 1000 will be described below.

FIG. 2 is an explanatory diagram illustrating an example of a process related to an information processing method in the information processing system 1000 according to the first embodiment. FIG. 2 illustrates an example in which the processing device 100 performs the communication of the first communication range or the communication of the second communication range with the information processing device 200 through a communication unit (which will be described later) with which the processing device 100 is equipped. Further, FIG. 2 illustrates an example in which the information processing device 200 performs the communication of the first communication range or the communication of the second communication range with the processing device 100 through a communication unit (which will be described later) with which the information processing device 200 is equipped. Furthermore, FIG. 2 illustrates an example in which the processing device 100 performs the process related to the processing method according to the present embodiment such as the authentication process through a processing unit (which will be described later) with which the processing device 100 is equipped, and the information processing device 200 performs the process in the information processing method according to the present embodiment such as the authentication process through a processing unit (which will be described later) with which the information processing device 200 is equipped.

Further, FIG. 2 illustrates an example in which the communication according to the present embodiment is BLE, the processing device 100 functions as the "BLE peripheral," and the information processing device 200 functions as the "BLE central."

Further, FIG. 2 illustrates an example in which a command related to the communication based on BLE and a command related to NFC are transmitted and received between the processing device 100 and the information processing device 200 according to a communication protocol of BLE. FIG. 2 illustrates an example in which the processing device 100 has an initiator function in NFC and undertakes the role of a reader/writer.

Specifically, in the example illustrated in FIG. 2, "Advertise," "Connect Request," "Connect Response," "Notification," and "Write" described between the communication units in FIG. 2 correspond to the command related to the communication based on BLE. Further, in the example illustrated in FIG. 2, "Polling Command," "Polling Response," "Request Service Command," "Request Service Response," "Authentication 1 Command," "Authentication 1 Response," "Authentication 2 Command," "Authentication 2 Response," "Write," and "Write Response" described between the processing unit and the communication unit of the respective devices in FIG. 2 correspond to examples of the command related to NFC. In FIG. 2, a command related to FeliCa (registered trademark) communication is illustrated as the command related to NFC. Hereinafter, the communication based on BLE is also indicated as the "BLE layer."

For example, the command related to NFC is transmitted and received between the processing device 100 and the information processing device 200 according to the communication protocol of BLE as illustrated in FIG. 2, and thus it is possible to increase, for example, an affinity with the existing device or the existing system in which various kinds of processes such as the process related to entrance and exit at the ticket gate and the payment process according to the command related to NFC.

Further, when the command related to NFC is transmitted according to the communication protocol of BLE, for example, since there is a restriction that only data of up to 20 [bytes] can be transmitted at a time, the command is divided and transmitted a plurality of times.

It will be appreciated that, in the information processing system 1000 according to the first embodiment, communication between the processing device 100 and the information processing device 200 is not limited to the example illustrated in FIG. 2. An example of the process in the information processing system 1000 will be described below with reference to FIG. 2.

The processing device 100 and the information processing device 200 establish a connection of the BLE layer (S100 to S104). For example, the connection of the BLE layer is established as follows.

The processing device 100 performs advertising at predetermined intervals such as 150 [ms] (S100).

The information processing device 200 that has detected the advertising transmits a command ("Connect Request") for establishing a connection (S102).

The processing device 100 transmits a response ("Connect Response") to the command (S104).

As illustrated in steps S100 to S104, in the example illustrated in FIG. 2, pairing is not performed in the BLE layer, and cryptographic communication is not performed between the processing device 100 and the information processing device 200 in the BLE layer. Further, in the information processing system 1000, pairing can be performed in the BLE layer, and the cryptographic communication can be performed between the processing device 100 and the information processing device 200 in the BLE layer as well.

When the connection of the BLE layer is established in steps S100 to S104, the processing device 100 and the information processing device 200 perform the mutual authentication through the communication of the first communication range (S106 to S120).

Here, in the example illustrated in FIG. 2, a process of steps S114 to S120 corresponds to the process related to the mutual authentication. In the example illustrated in FIG. 2, a process of steps S114 and S118 corresponds to an example of the authentication process the processing device 100, and a process of steps S116 and S120 corresponds to an example of the authentication process in the information processing device 200. In a process of step S120, the information processing device 200 may transmit a signal regularly or irregularly after the communication related to the authentication is completed. For example, the signal regularly or irregularly transmitted from the information processing device 200 in step S120 is used for determination related to the signal strength in the processing device 100 or determination of whether or not the information processing device 200 is located within the first communication distance in the processing device 100.

Further, before the mutual authentication is performed, for example, a process (S106 and S108) in which the processing device 100 acquires unique identification information (data) such as IDm from the information processing device 200 and a process (S110 and S112) in which the processing device 100 checks the presence of a service in the information processing device 200 (a process of checking whether or not the information processing device 200 supports a service) are performed between the processing device 100 and the information processing device 200. In the information processing system 1000, for example, the process related to the mutual authentication and the like are performed using the identification information.

Here, the reason for performing the process of steps S106 to S112 between the processing device 100 and the information processing device 200 before the mutual authentication is performed is to increase, for example, the affinity with the existing device or the existing system that performs various kinds of processes through the command related to NFC. Thus, in the information processing system 1000, for example, the process of steps S106 to S112 may not be performed between the processing device 100 and the information processing device 200 before the mutual authentication is performed.

The process in the information processing system 1000 which is capable of increasing the affinity with the existing device or the existing system that performs various kinds of processes through the command related to NFC is not limited to the example illustrated in FIG. 2.

For example, in the information processing system 1000, instead of performing the process of step S106 through the processing device 100, the process of step S106 and the process of S108 may be performed between the communication unit and the processing unit of the information processing device 200 as a dummy process. Further, when the dummy process is performed, in the information processing system 1000, the process related to the mutual authentication and the like are performed, for example, using a fixed IDm which is set in advance (for example, "[000 . . . 000]," [FFF . . . FFF], or the like).

When the mutual authentication is performed in steps S106 to S120, the processing device 100 determines whether or not the information processing device 200 is located within the second communication distance, and switches the communication of the first communication range to the communication of the second communication range when the information processing device 200 is determined to be located within the second communication distance. Here, the processing device 100 determines whether or not the information processing device 200 is located within the second communication distance, for example, by performing any one of the determination processes according to the first to third examples illustrated in (A) to (C).

Then, the processing device 100 and the information processing device 200 perform the communication-based process such as the process related to entrance and exit at the ticket gate through the communication of the second communication range (S122, S124, . . . ).

Here, in the information processing system 1000, since the mutual authentication is performed in steps S114 to S120, the communication-based process by the command related to NFC subsequent to step S122 can be performed through a process performed through the cryptographic communication. Thus, the processing device 100 and the information processing device 200 can perform a secure process through, for example, the communication of the second communication range (the communication of the second communication distance).

For example, when the process illustrated in FIG. 2 is performed, in the information processing system 1000, the mutual authentication is performed through the communication of the first communication range, and the communication-based process is performed through the communication of the second communication range. Thus, when the processing device 100 and the information processing device 200 perform, for example, the process illustrated in FIG. 2, the information processing system 1000 capable of improving the convenience of the user is implemented.

It will be appreciated that the example of the process in the information processing method according to the present embodiment in the information processing system 1000 is not limited to the example illustrated in FIG. 2.

[2] Information Processing System According to Second Embodiment

Next, an information processing system including a plurality of processing devices according to the present embodiment will be described as an information processing system according to a second embodiment.

Figure 3:
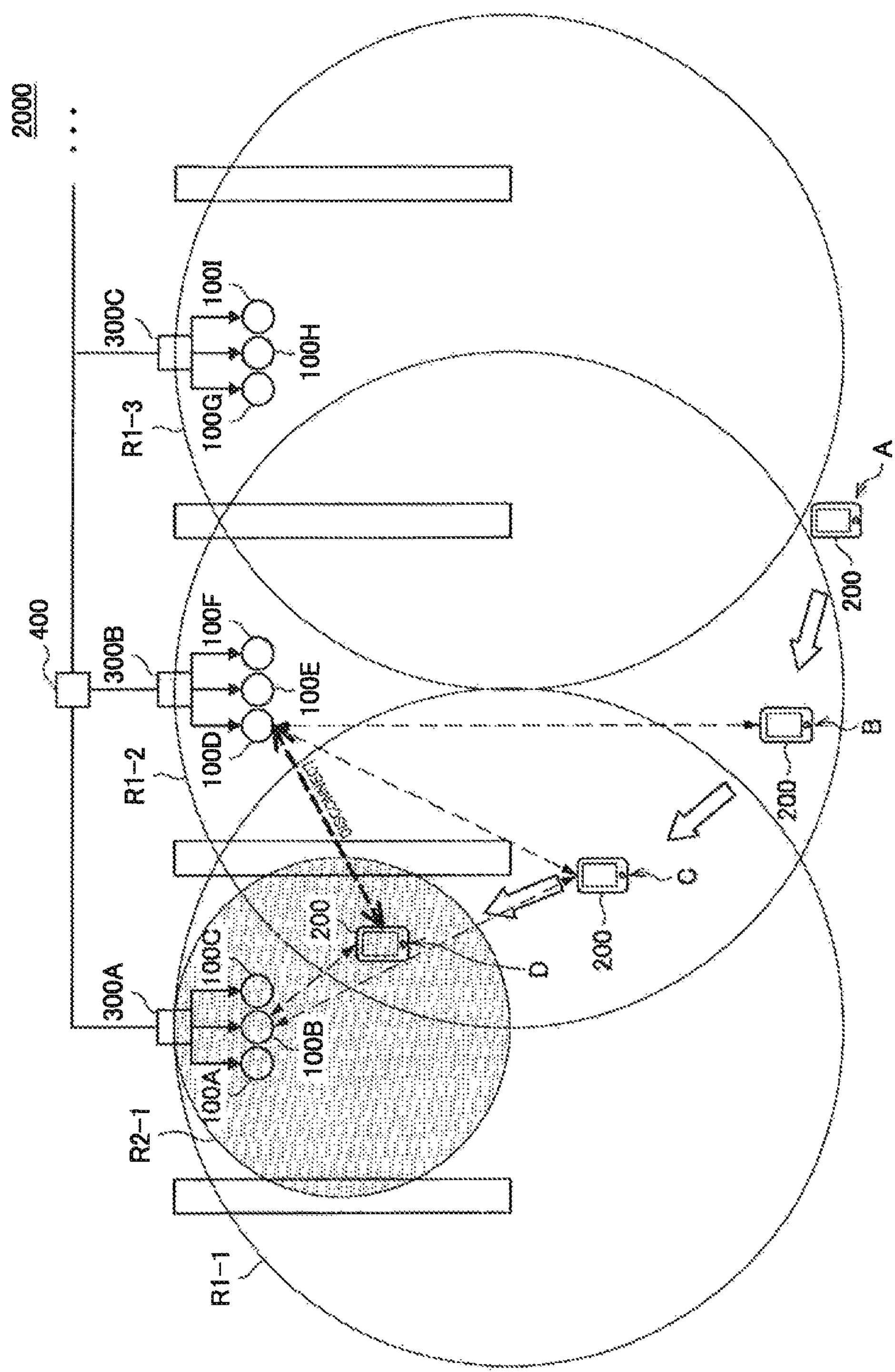
FIG. 3 is an explanatory diagram illustrating an example of an information processing system according to a second embodiment.

FIG. 3 is an explanatory diagram illustrating an example of an information processing system 2000 according to the second embodiment. The information processing system 2000 includes, for example, processing devices 100A, 100B, . . . , an information processing device 200, distributed management devices 300A, 300B, . . . , and a central management device 400. Hereinafter, one or more of a plurality of processing devices 100A, 100B, . . . are also referred to collectively as a "processing device 100." Further, hereinafter, one or more of a plurality of distributed management devices 300A, 300B, . . . are also referred to collectively as a "distributed management device 300."

FIG. 3 illustrates an example in which three processing devices 100 and one distributed management device 300 are installed in each ticket gate (at a corresponding position inside or outside the ticket gate). The three processing devices 100 and one distributed management device 300 are, for example, connected in a wired or wireless manner. Here, the processing device 100 installed in one ticket gate advertises, for example, the same identifier (for example, an ID or the like) in the communication of the first communication range. For example, the identifiers which are advertised by the processing devices 100 installed in the respective ticket gates in the communication of the first communication range are different.

The processing device 100 constituting the information processing system 2000 stores an ID related to provision of a set shared service in a storage unit (which will be described later) or the like. As an ID related to provision of a service according to the present embodiment, for example, there are an ID called "Service" and an II) called "Characteristic." The ID related to the provision of the service may be common to a plurality of information processing systems according to the second embodiment. An ID related to provision of a service according to the present embodiment is not limited to a common ID. For example, there may be a plurality of IDs related to the provision of the service when there is an agreement between a service provider (or a service providing company) and a provider of an application corresponding to a service which is executed in the information processing device 200 (or an application providing company).

Further, FIG. 3 illustrates an example in which the information processing device 200 is a communication device such as a smart phone.

In FIG. 3, "R1_1" indicates the first communication range in the processing devices 100A to 100C, and "R2_1" indicates the second communication range in the processing devices 100A to 100C. In FIG. 3, "R1_2" indicates the first communication range in the processing devices 100D to 100F, and "R1_3" indicates the first communication range in the processing devices 100E to 100I.

The distributed management device 300 and the central management device 400 are connected to each other, for example, via a network (or directly). Here, examples of a network according to the present embodiment include a wired network such as a local area network (LAN) or a wide area network (WAN), a wireless network such as a wireless LAN (WLAN), and the Internet using a communication protocol such as a transmission control protocol/Internet protocol (TCP/IP).

A configuration of the information processing system 2000 according to the second embodiment is not limited to the example illustrated in FIG. 3.

For example, FIG. 3 illustrates an example in which a plurality of ticket gates are installed, and a plurality of processing devices 100 are installed in each ticket gate. The information processing system according to the second embodiment may have a configuration in which one ticket gate is installed, and a plurality of a plurality of processing devices 100 are installed in one ticket gate. When the information processing system according to the second embodiment has this configuration, the information processing system according to the second embodiment may not include, for example, the central management device 400.

Further, the information processing system according to the second embodiment may have a configuration in which one processing device 100 is installed in each of a plurality of ticket gates. When the information processing system according to the second embodiment has this configuration, the information processing system according to the second embodiment may not include, for example, the distributed management device 300.

Further, FIG. 3 illustrates an example in which the distributed management device 300 is installed in the ticket gate, but the distributed management device 300 may be installed at an arbitrary position at which communication with a corresponding processing device 100 can be performed.

Further, when one or more of a plurality of processing devices 100 constituting the information processing system according to the second embodiment have the function of the distributed management device 300 or the function of the central management device 400, the information processing system according to the second embodiment may not include the distributed management device 300 or the central management device 400.

Further, the information processing system according to the second embodiment may include a plurality of information processing devices. When the information processing system according to the second embodiment includes a plurality of information processing devices, a process similar to that of the information processing device 200 constituting the information processing system 2000 to be described below is performed in each of the information processing devices. Further, when the information processing system according to the second embodiment includes a plurality of information processing devices, a process similar to a process performed between the information processing device 200 constituting the information processing system 2000 to be described below and the processing device 100 is performed between the information processing device 200 and the processing device 100.

Next, an example of a process in the information processing system 2000 will be described using an example in which the user of the information processing device 200 who uses the information processing system 2000 illustrated in FIG. 3 moves toward the ticket gate in which the processing devices 100A to 100C are installed while carrying the information processing device 200.

[2-1] Overview of Process in Information Processing System 2000

[2-1-1] When User of Information Processing Device 200 Moves from Position Indicated by A in FIG. 3 to Position Indicated by B in FIG. 3

When the user of the information processing device 200 moves from the position indicated by A in FIG. 3 to the position indicated by B in FIG. 3, and thus the information processing device 200 enters a first communication range R1_2 in the processing devices 100D to 100F, the mutual authentication is performed between one of the processing devices 100D to 100*f* and the information processing device 200. FIG. 3 illustrates an example in which the mutual authentication is performed between the processing device 100D and the information processing device 200.

Further, the processing devices 100D to 100F do not establish the communication of the first communication range with the information processing device 200 when another processing device 100 among the processing devices 100D to 100F in the ticket gate in which each of the processing devices 100D to 100E is installed is determined to perform communication with the information processing device 200 (the communication target device). In other words, in this case, not all of the processing devices 100D to 100E perform communication with the information processing device 200. Here, another processing device 100 among the processing devices 100D to 100F in the ticket gate in which each of the processing devices 100D to 100E is installed corresponds to an example of a predetermined processing device among the other processing devices 100 other than its own device.

For example, each of the processing devices 100D to 100E determines whether or not another processing device 100 performs communication with the information processing device 200 based on connection information corresponding to the information processing device 200 (the communication target device) which is acquired from the distributed management device 300B (an example of an external device of the processing device 100).

Here, the connection information according to the present embodiment is data indicating a communication state. Examples of the connection information according to the present embodiment include identification information identifying the communication target device such as the information processing device 200 (for example, an ID such as the information processing device) and data indicating that communication is performed (for example, a flag or the like). Further, the identification information identifying the processing device that performs communication with the communication target device such as the information processing device 200 (for example, an ID of the processing device or the like) may be included in the connection information according to the present embodiment.

Further, the connection information related to the communication between the processing devices 100D to 100F and the information processing device 200 is managed, for example, by the distributed management device 300B connected with the processing devices 100D to 100F.

As a specific example, for example, when a response transmitted from the information processing device 200 is detected through the communication of communication range, each of the processing devices 100D to 100F transmits the identification information of the information processing device 200 acquired from the response or the like to the distributed management device 300B.

The distributed management device 300B that has received the identification information of the information processing device 200 from each of the processing devices 100D to 100F generates, for example, the connection information corresponding to the information processing device 200. The distributed management device 300B may generate the connection information including the identification information of the processing device 100 that has transmitted the identification information that has been initially received. When the communication between the processing device 100 and the information processing device 200 is disconnected or after a set predetermined period of time elapses after the communication is disconnected, the distributed management device 300B invalidates the connection information corresponding to the information processing device 200, for example, by deleting the connection information corresponding to the information processing device 200.

For example, when the above-described process is performed in the distributed management device 300B, the connection information related to the communication between the processing devices 100D to 100F and the information processing device 200 is managed by the distributed management device 300B.

For example, each of the processing devices 100D to 100F acquires the connection information corresponding to the information processing device 200 from the distributed management device 300B. Each of the processing devices 100D to 100F transmits, for example, the identification information of the information processing device 200 and a transmission request including a transmission command for the connection information to the distributed management device 300B, and acquires the connection information corresponding to the information processing device 200 from the distributed management device 300B.

When the connection information corresponding to the information processing device 200 is not acquired or when the identification information corresponding to its own device (any one of the processing devices 100D to 100F) is included in the acquired connection information, each of the processing devices 100D to 100F establishes the communication of the first communication range with the information processing device 200. Further, when the identification information corresponding to another processing device 100 is included in the acquired connection information, the processing devices 100D to 100F do not establish the communication of the first communication range with the information processing device 200.

When the user of the information processing device 200 moves from the position indicated by A in FIG. 3 to the position indicated by B in FIG. 3, for example, the above-described process is performed in the information processing system 2000, and thus the mutual authentication is performed between the processing device 100D and the information processing device 200 through the communication of the first communication range.

[2-1-2] When User of Information Processing Device 200 Moves from Position Indicated by B in FIG. 3 to Position Indicated by C in FIG. 3

When the user of the information processing device 200 moves from the position indicated by B in FIG. 3 to the position indicated by C in FIG. 3 and the information processing device 200 comes within the first communication range R1_1 in the processing devices 100A to 100C, the same process as in [2-1-1] is performed, and thus the mutual authentication is performed between one of the processing devices 100A to 100C and the information processing device 200. FIG. 3 illustrates an example in which the mutual authentication is performed between the processing device 100B and the information processing device 200.

In other words, when the user of the information processing device 200 moves from the position indicated by B in FIG. 3 to the position indicated by C in FIG. 3, the information processing device 200 enters a state in which the mutual authentication by the first communication range is performed with each of a plurality of processing devices 100 such as the processing device 100B and the processing device 100D.

[2-1-3] When User of Information Processing Device 200 Moves from Position Indicated by C in FIG. 3 to Position Indicated by D in FIG. 3

When the user of the information processing device 200 moves the position indicated by C in FIG. 3 to the position indicated by D in FIG. 3 and the information processing device 200 enters the second communication range R2_1 in the processing device 100B, the processing device 100B switches communication from the communication of the first communication range to the communication of the second communication range. Then, the processing device 100B performs the communication-based process with the information processing device 200 through the communication of the second communication range.

Further, when the information processing device 200 comes within the second communication range R2_1 in the processing device 100B, in the information processing system 2000, the communication of the first communication range between the information processing device 200 and the processing device 100D is disconnected. In the information processing system 2000, the disconnection of the communication of the first communication range between the information processing device 200 and the processing device 100D is performed in, for example, either or both of the processing device 100D and the information processing device 200. A process related to the disconnection of the communication according to the present embodiment will be described later.

In the information processing system 2000, for example, when the processes described in [2-1-1] to [2-1-3] are performed, the communication-based process is performed between the processing device 100B which is one of a plurality of processing devices 100 and the information processing device 200 through the communication of the second communication range.

[2-2] Process in Processing Device 100 (Process Related to Processing Method According to Present Embodiment)

When the information processing device 200 comes within the first communication distance in the communication of the processing device 100, the processing device 100 basically performs the authentication process of authenticating the information processing device 200 (the communication target device) through the communication of the first communication range, similarly to the processing device 100 constituting the information processing system 1000 according to the first embodiment.

Here, the processing device 100 does not perform communication with the information processing device 200 when the information processing device 200 (the communication target device) is determined to perform communication with a predetermined other processing device 100. For example, the predetermined other processing device 100 is another processing device 100 which is associated with the external device such as the distributed management device 300 such as another processing device 100 installed in one ticket gate in FIG. 3.

For example, the processing device 100 determines whether or not the information processing device 200 performs communication with a predetermined other processing device based on the connection information corresponding to the information processing device 200 (the communication target device) which is acquired from the external device such as the distributed management device 300 as described above with reference to FIG. 3.

Then, when the information processing device 200 (the communication target device) is located within the second communication distance, the processing device 100 performs the communication-based process with the authenticated information processing device 200 through the communication of the second communication range, similarly to the processing device 100 constituting the information processing system 1000 according to the first embodiment.

The processing device 100 constituting the information processing system 2000 according to the second embodiment performs, for example, the above-described process as the process related to the processing method according to the present embodiment, authenticates the information processing device 200 (the communication target device) through the communication of the first communication range, switches the communication of the first communication range to the communication of the second communication range, and performs the communication-based process with the authenticated information processing device 200 through the second communication range.

The process in the processing device 100 constituting the information processing system 2000 according to the second embodiment is not limited to the above-described process.

For example, the processing device 100 may further perform a disconnection process of disconnecting the communication with the information processing device 200 (the communication target device) which is being performed.

The processing device 100 disconnects the communication with the information processing device 200 which is being performed, for example, when disconnection information corresponding to the information processing device 200 (the communication target device) that is performing the communication is acquired from the external device such as the distributed management device 300 which is connected thereto. Here, the disconnection information according to the present embodiment is, for example, data including the identification information of the information processing device 200 and a command to disconnect the communication which is being performed.

For example, the disconnection information according to the present embodiment is generated by a device capable of managing the entire information processing system according to the second embodiment such as the central management device 400.

As an example of a process related to generation of the disconnection information in the information processing system 2000 illustrated in FIG. 3, the processing device 100 that determines that the information processing device 200 (the communication target device) that performs the communication by the first communication range is located within the second communication distance transmits, for example, data including a determination result and the identification information of the information processing device 200 to the distributed management device 300 which is connected thereto. The distributed management device 300 that has acquired the data including the determination result and the like transmits the acquired data including the determination result and the like to the central management device 400 which is connected thereto. The central management device 400 that has acquired the data including the determination result and the like generates the disconnection information corresponding to the information processing device 200, and transmits the disconnection information to the distributed management device 300 other than the distributed management device 300 that has transmitted the data including the determination result and the like. The distributed management device 300 that has acquired the disconnection information transmits the acquired distributed management device 300 to the processing device 100 which is connected thereto.

When the identification information of the device that is performing the communication corresponds to the identification information included in the disconnection information, the processing device 100 that has acquired the disconnection information disconnects the communication with the information processing device 200 (the communication target device) which is being performed. For example, when the identification information of the device that is performing the communication is identical to the identification information included in the disconnection information or when the identification information of the device that is performing the communication is included in the identification information included in the disconnection information, the processing device 100 determines that the identification information of the device that is performing the communication corresponds to the identification information included in the disconnection information.

Figure 4:
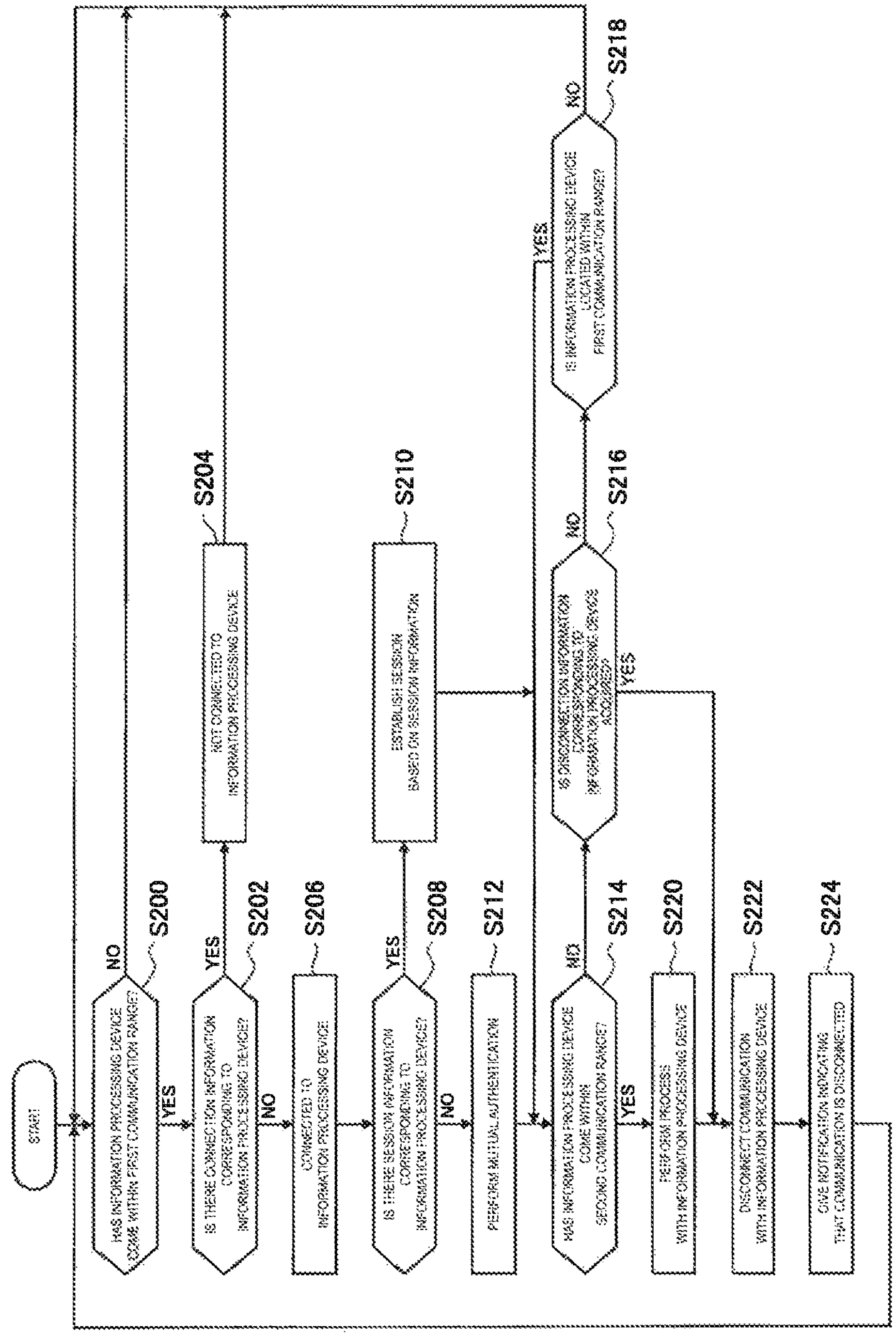
FIG. 4 is a flowchart illustrating an example of a process in a processing device according to the present embodiment that constitutes the information processing system according to the second embodiment.

Next, a specific example of the process in the processing device 100 constituting the information processing system 2000 according to the second embodiment will be described. FIG. 4 is a flowchart illustrating an example of a process in the processing device 100 according to the present embodiment constituting the information processing system 2000 according to the second embodiment.

The processing device 100 determines whether or not the information processing device 200 has come within the first communication range (S200). For example, when there is a response from the information processing device 200 to the advertisement transmitted through the communication of the first communication range, the processing device 100 determines that the information processing device 200 has come within the first communication range.

When the information processing device 200 is determined not to have come within the first communication range in step S200, the processing device 100 is on standby until the information processing device 200 is determined to have come within the first communication range.

Further, when the information processing device 200 is determined to have come within the first communication range in step S200, the processing device 100 determines whether or not there is the connection information corresponding to the information processing device 200 (S202). The processing device 100 performs, for example, a process of acquiring the connection information corresponding to the information processing device 200 from the distributed management device 300 (an example of the external device) connected to the processing device 100, and determines whether or not there is the connection information corresponding to the information processing device 200 based on an acquisition result.

When there is determined to be the connection information corresponding to the information processing device 200 in step S202, the processing device 100 neither establishes the communication with the information processing device 200 nor is connected to the information processing device 200 (S204). Then, the processing device 100 repeats, for example, the process starting from step S200.

Further, when there is determined to be the connection information corresponding to the information processing device 200 in step S202, the processing device 100 establishes the communication with the information processing device 200 and is connected to the information processing device 200 (S208).

The processing device 100 determines whether or not there is session information corresponding to the information processing device 200 (S208). Here, the session information according to the present embodiment is, for example, data indicating a session related to NFC (a session related to the communication-based process indicated by the command related to NFC). The processing device 100 performs, for example, a process of acquiring the session information corresponding to the information processing device 200 from the distributed management device 300 (an example of the external device) connected to the processing device 100, and determines whether or not there is session information corresponding to the information processing device 200 based on an acquisition result.

When there is determined to be session information corresponding to the information processing device 200 in step S208, the processing device 100 establishes a session with the information processing device 200 based on the session information (S210). Then, the processing device 100 performs a process of step S214 which will be described later.

Further, when there is determined not to be the session information corresponding to the information processing device 200 in step S208, the processing device 100 performs the mutual authentication with the information processing device 200 through the communication of the first communication range (S212). Then, the processing device 100 performs a process of step S214 which will be described later.

The processing device 100 determines whether or not the information processing device 200 has come within the second communication range (S214). The processing device 100 determines whether or not the information processing device 200 is located within the second communication distance, for example, by performing any one of the determination processes according to the first to third examples described in (A) to (C).

When the information processing device 200 is determined not to have come within the second communication range in step S214, the processing device 100 determines whether or not the disconnection information corresponding to the information processing device 200 is acquired (S216).

When the disconnection information corresponding to the information processing device 200 is determined to be acquired in step S216, the processing device 100 performs a process of step S222 which will be described later.

Further, when the disconnection information corresponding to the information processing device 200 is determined not to be acquired in step S216, the processing device 100 determines whether or not the information processing device 200 is located within the first communication range (S218). For example, when a signal transmitted from the information processing device 200 through the communication of the first communication range is not detected for a predetermined set period of time, the processing device 100 determines that the information processing device 200 is not located within the first communication range.

When the information processing device 200 is determined to be located within the first communication range in step S218, the processing device 100 repeats the process starting from step S214.

Further, when the information processing device 200 is determined to be located within the first communication range in step S218, the processing device 100 repeats the process starting from step S200.

When the information processing device 200 is determined to have come within the second communication range in step S214, the processing device 100 switches the communication of the first communication range to the communication of the second communication range, and performs the communication-based process with the information processing device 200 through the communication of the second communication range (S220).

When the disconnection information corresponding to the information processing device 200 is determined to be acquired in step S216 or when the process of step S220 is completed, the processing device 100 disconnects the communication with the information processing device 200 (S222). The processing device 100 gives a notification indicating that the communication with the information processing device 200 is disconnected to either or both of the distributed management device 300 and the central management device 400 (S224). Then, the processing device 100 repeats the process starting from step S200.

The processing device 100 constituting the information processing system 2000 according to the second embodiment performs, for example, the process illustrated in FIG. 4. It will be appreciated that the process of the processing device 100 constituting the information processing system 2000 is not limited to the example illustrated in FIG. 4.

[2-3] Process in Information Processing Device 200 (Process in Information Processing Method According to Present Embodiment)

The information processing device 200 performs the authentication process of authenticating the processing device 100 through the communication of the first communication range with the processing device 100 that performs the communication of the first communication range, similarly to the information processing device 200 constituting the information processing system 1000 according to the first embodiment. Here, the information processing device 200 authenticates each of a plurality of processing devices 100 through the communication of the first communication range with each of a plurality of processing devices 100 that are performing the communication of the first communication range and constitute the information processing system 2000.

Then, the information processing device 200 performs the communication-based process with the authenticated processing device 100 through the communication of the second communication range switched from the communication of the first communication range in the processing device 100, similarly to the information processing device 200 constituting the information processing system 1000 according to the first embodiment.

The information processing device 200 constituting the information processing system 2000 according to the second embodiment performs the same process as the information processing device 200 constituting the information processing system 1000 according to the first embodiment as the process related to the processing method according to the present embodiment.

The process in the information processing device 200 constituting the information processing system 2000 according to the second embodiment is not limited to the above-described process.

For example, when the process by the communication of the second communication range with one of a plurality of authenticated processing devices 100 starts, the information processing device 200 may further perform the disconnection process of disconnecting communication with another processing device 100 among a plurality of authenticated processing devices 100.

For example, any one of the following processes illustrated in (a) to (c) is performed as the disconnection process in the information processing device 200 according to the present embodiment. Further, when another processing device 100 among a plurality of authenticated processing devices 100 is one processing device 100, regardless of which of the following processes illustrated in (a) to (c) is performed, the same result that communication with one processing device 100 is disconnected is obtained.

(a) First Example of Disconnection Process

For example, when the communication with another processing device 100 is disconnected, the information processing device 200 performs the disconnection in synchronization with the communication with another processing device 100.

When another processing device 100 among a plurality of authenticated processing devices 100 is a plurality of processing devices 100, communication with a plurality of processing devices 100 is simultaneously (substantially simultaneously) disconnected.

(b) Second Example of Disconnection Process

For example, when the communication with another processing device 100 is disconnected, the information processing device 200 sequentially disconnects the communication in a predetermined order based on an estimated distance from the processing device 100.

For example, the information processing device 200 estimates the distance from another processing device 100 based on the signal strength in the communication of the first communication range with another processing device 100. The information processing device 200 can also estimate the distance from another processing device 100 using an arbitrary method which is applicable to the information processing system 2000 and capable of estimating the distance from another processing device 100.

As a predetermined order based on the estimated distance from the processing device 100 according to the present embodiment, for example, the following examples are used.

- The disconnection is performed in synchronization with the communication with another processing device 100 in order from another processing device 100 that is far from the information processing device 200.
- The disconnection is performed in synchronization with the communication with another processing device 100 in order from another processing device 100 that is close to the information processing device 200.

(c) Another Example of Disconnection Process

When the communication with another processing device 100 is disconnected, the information processing device 200 disconnects the communication with another processing device 100, for example, in a random order or an order based on a predetermined rule which is set such as ascending order of priority set in the processing device 100.

[2-4] Process in the Distributed Management Device 300

For example, the distributed management device 300 has a function of managing a communication state in the processing device 100 which is connected thereto. For example, the distributed management device 300 manages, for example, the connection information and prevents a plurality of processing devices 100 connected thereto from performing communication with the same communication target device at the same time. The distributed management device 300 transmits, for example, the disconnection information to a plurality of processing devices 100 connected thereto and disconnects the communication between the device corresponding to the disconnection information and the processing device 100.

[2-5] Process in Central Management Device 400

For example, the central management device 400 has a function of managing the entire information processing system 2000.

The central management device 400 manages the entire information processing system 2000 based on information acquired from the distributed management device 300 or the like connected thereto, for example, by delivering the acquired information or information generated based on the acquired information to the distributed management device 300 or the like connected thereto. The acquisition of information from each of the processing devices 100 is performed, for example, through the distributed management device 300.

Here, the acquired information includes, for example, the session information corresponding to the communication between the processing device 100 and the communication target device and the like. The information generated based on the acquired information includes, for example, the disconnection information generated as described above and the like. For example, when the disconnection information is generated in any other device such as the distributed management device 300, the disconnection information may be the acquired information.

Further, the central management device 400 can also control, for example, the disconnection of the communication between the processing device 100 and the communication target device. The central management device 400 controls the disconnection between the processing device 100 and the communication target device corresponding to the disconnection information, for example, by controlling delivery of the disconnection information.

In the case of an example in which the central management device 400 generates the disconnection information corresponding to a certain communication target device based on data acquired from a certain distributed management device 300, and delivers the disconnection information to other distributed management devices 300. The central management device 400 controls the disconnection of the communication between the processing device 100 connected to each of the distributed management devices 300 and the communication target device corresponding to the disconnection information, for example, by transmitting the disconnection information to other distributed management devices 300 and delivering the disconnection information as follows.

- The central management device 400 transmits the delivery information to the other distributed management devices 300 in a synchronous manner.
- The central management device 400 sequentially transmits the delivery information in a predetermined order (for example, descending order of distance, ascending order of distance, or the like) based on distances between the certain distributed management device 300 and the other distributed management devices 300. The distances between the certain distributed management device 300 and the other distributed management devices 300 may be set in advance or may be calculated based on data indicating the position of the distributed management device 300 acquired from the distributed management devices 300 or the like.
- The central management device 400 sequentially transmits the delivery information in an order based on a random order or a predetermined rule which is set such as ascending order of priority set in the distributed management device 300.

Figure 5:
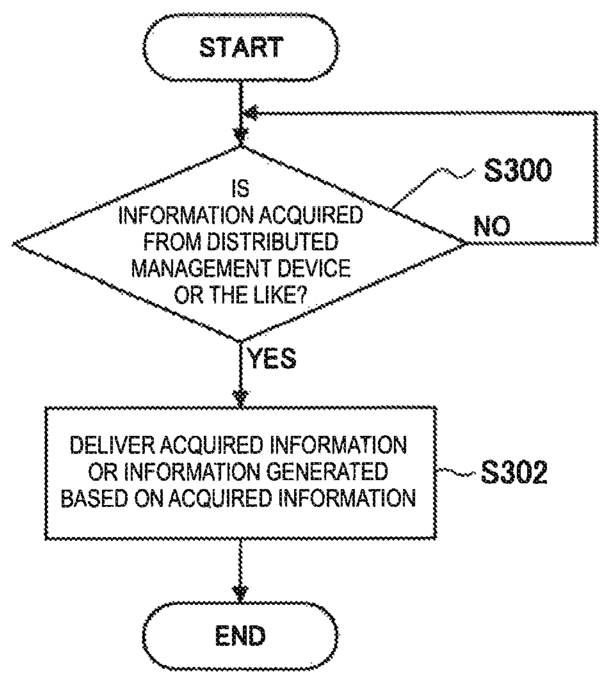
FIG. 5 is a flowchart illustrating an example of a process in a central management device that constitutes the information processing system according to the second embodiment.

FIG. 5 is a flowchart illustrating an example of a process in the central management device 400 constituting the information processing system 2000 according to the second embodiment.

The central management device 400 determines whether or not information transmitted from the distributed management device 300 or each of the processing devices 100 is acquired (S300). When the information is determined not to be acquired in step S300, the central management device 400 is on standby until the information is determined to be acquired.

Further, when the information is determined to be acquired in step S300, the central management device 400 delivers the acquired information or information generated based on the acquired information to the distributed management device 300 or each of the processing devices 100 which are connected thereto (S302). The delivery of the information to each of the processing devices 100 is, for example, performed through the distributed management device 300.

The central management device 400 constituting the information processing system 2000 according to the second embodiment performs, for example, a process illustrated in FIG. 5. It will be appreciated that the process of the central management device 400 constituting the information processing system 2000 is not limited to the example illustrated in FIG. 5.

(Processing Device and Information Processing Device According to Present Embodiment)

Next, a configuration of the processing device according to the present embodiment and a configuration of the information processing device according to the present embodiment, which are capable of implementing the information processing system according to the present embodiment, will be described.

[I] Processing Device According to Present Embodiment

Figure 6:
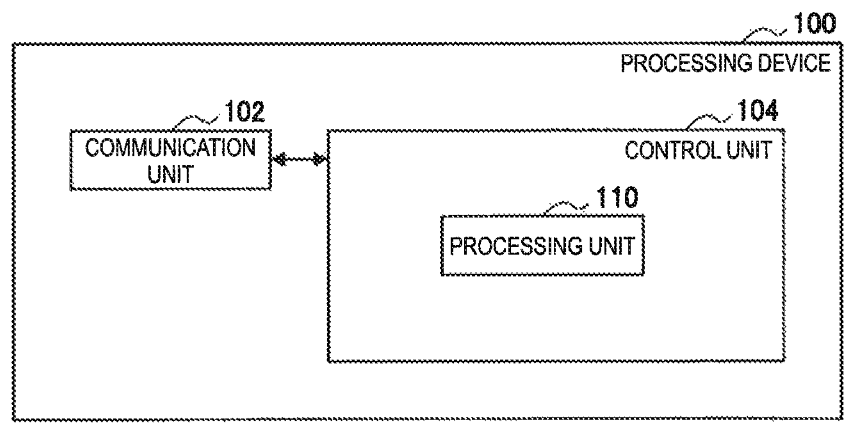
FIG. 6 is a block diagram illustrating an example of a configuration of the processing device according to the present embodiment.

FIG. 6 is a block diagram illustrating an example of a configuration of the processing device 100 according to the present embodiment. The processing device 100 includes, for example, a communication unit 102 and a control unit 104.

The processing device 100 may include, for example, a read only memory (ROM) (not shown), a random access memory (RAM) (not shown), a storage unit (not shown), an operation unit (not shown) that may be operated by the user, a display unit (not shown) that displays various images on a display screen and the like. The processing device 100 connects the aforementioned components, for example, by means of a bus as a data transfer path.

The ROM (not shown) stores data for control, such as programs and operation parameters used by the control unit 104. The RAM (not shown) temporarily stores a program executed by the control unit 104.

The storage unit (not shown) is a storage means included in the processing device 100 and stores, for example, system softwares such as an operating system (OS), middlewares, and data such as various applications. Here, as the storage unit (not shown), for example, a magnetic recording medium such as a hard disk, a nonvolatile memory such as a flash memory or the like may be exemplified. In addition, the storage unit (not shown) may be attachable to/detachable from the processing device 100.

As the operation unit (not shown), an operation input device which will be described later may be exemplified. As the display unit (not shown), a display device which will be described later may be exemplified.

[Example of Hardware Configuration of Processing Device 100]

Figure 7:
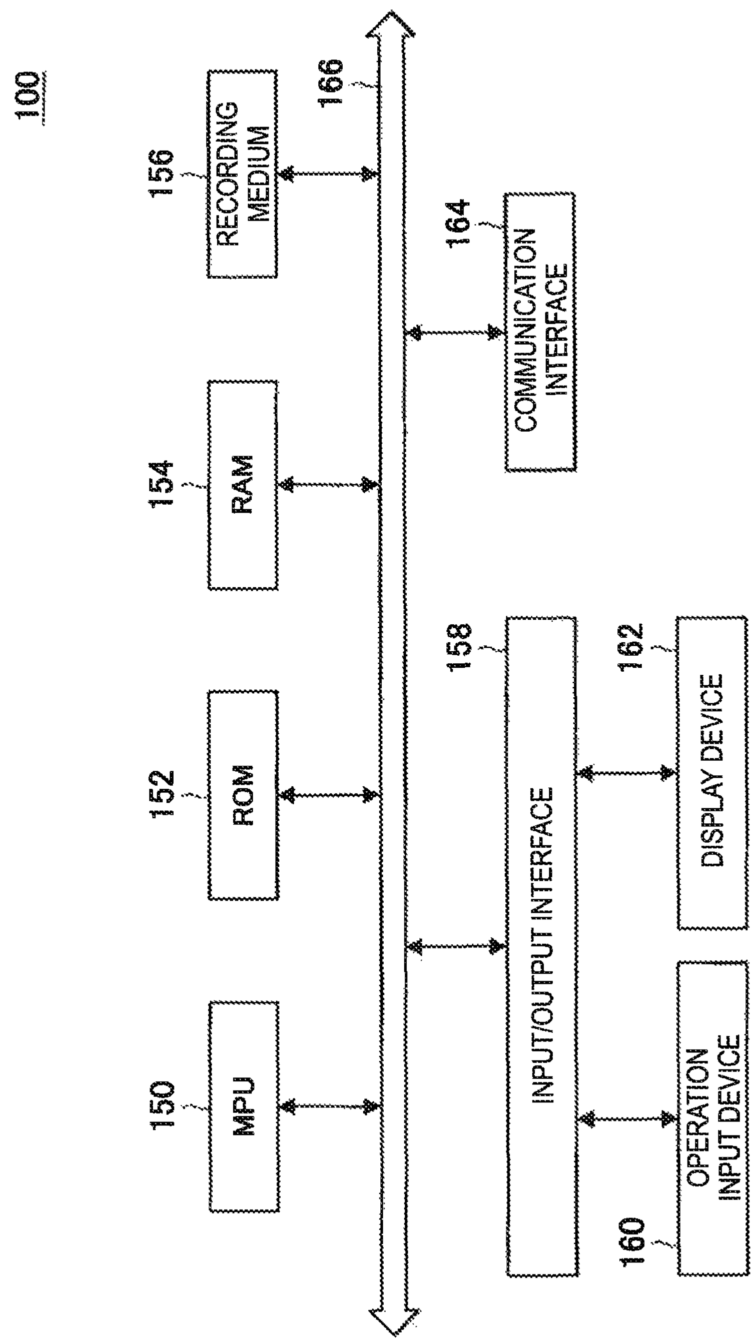
FIG. 7 is an explanatory diagram illustrating an example of a hardware configuration of the processing device according to the present embodiment.

FIG. 7 is an explanatory diagram of an example of the hardware configuration of the processing device 100 according to the embodiment. The processing device 100 includes, for example, an MPU 150, a ROM 152, a RAM 154, a recording medium 156, an input/output interface 158, an operation input device 160, a display device 162, and a communication interface 164. In addition, the processing device 100 connects the components, for example, by means of a bus 166 as a data transfer path.

The MPU 150 is composed of one or more processors configured as operation circuits such as a micro-processing unit (MPU) and various processing circuits and functions as the control unit 104 that controls the information processing device 100. In addition, the MPU 150 serves as, for example, a processing unit 110 described later in the processing device 100.

The ROM 152 stores data for control, such as programs and operation parameters used by the MPU 150, and the like. The RAM 154 temporarily stores, for example, a program or the like executed by the MPU 150.

The recording medium 156 functions as the storage unit (not shown) and stores, for example, stores system softwares and middlewares, or various data such as various applications. Here, as the recording medium 156, for example, a magnetic recording medium such as a hard disk or a non-volatile memory such as a flash memory may be exemplified. Furthermore, the recording medium 156 may be attachable to/detachable from the processing device 100.

The input/output interface 158 is connected, for example, to the operation input device 160 and the display device 162. The operation input device 160 serves as the operation unit (not shown) and the display device 162 serves as the display unit (not shown). Here, as the input/output interface 158, for example, a universal serial bus (USB) port, a digital visual interface (DVI) terminal, a high-definition multimedia interface (HDMI) (registered trademark) terminal, various processing circuits or the like may be exemplified.

In addition, the operation input device 160 is, for example, included in the processing device 100 and connected to the input/output interface 158 inside of the processing device 100. As the operation input device 160, for example, a button, a direction key, a rotary type selector such as a jog dial or a combination thereof may be exemplified.

Furthermore, the display device 162 is, for example, included in the processing device 100 and connected to the input/output interface 158 inside of the processing device 100. As the display device 162, for example, a liquid crystal display, an organic electro-luminescence display (which is also referred to as an organic light emitting diode (OLED) display) or the like may be exemplified.

Of course, the input/output interface 158 may be connected to an external device such as an external operation input device (e.g., a keyboard, a mouse, etc.) and an external display device as external devices of the processing device 100. Furthermore, the display device 162 may be, for example, a device that enables display and a user operation, such as a touch panel.

The communication interface 164 is a communication unit with which the processing device 100 is equipped, and functions as the communication unit 102 that performs communication with the external device such as the information processing device according to the present embodiment. Here, the communication interface 164 includes, for example, an IEEE 802.15.1 port and a transceiving circuit, an IEEE802.11 port and a transceiving circuit, or the like.

For example, the communication interface 164 is configured with one communication module that can transmit a signal at a plurality of transmission power levels or a plurality of communication modules that differ in transmission power for transmitting a signal.

The processing device 100 performs the processing of the processing method according to the present embodiment, for example, according to the configuration illustrated in FIG. 7. The hardware configuration of the processing device 100 according to the embodiment is not limited to the configuration illustrated in FIG. 7.

For example, the processing device 100 may not include the communication interface 164 when the information processing device 100 performs communication with an external device via an external communication device connected thereto.

The processing device 100 may have a configuration that does not include the recording medium 156, the operation input device 160, or the display device 162, for example.

For example, the processing device 100 may further include any other communication device such as a LAN terminal, a transceiving circuit, a communication antenna such as an LTE/3G antenna, or a radio frequency (RF).

For example, the processing device 100 may further include an arbitrary sensor capable of detecting an object such as an infrared sensor.

Further, for example, the configuration illustrated in FIG. 7 (or a configuration related to a modified example) may be implemented by one or more integrated circuits (ICs).

An example of a configuration of the processing device 100 will be described with reference back to FIG. 6. The communication unit 102 is a communication unit with which the processing device 100 is equipped, and performs communication with the external device such as the information processing device according to the present embodiment, for example, through the communication of the first communication range (the communication of the first communication distance) or the communication of the second communication range (the communication of the second communication distance). The communication of the communication unit 102 is controlled by, for example, the control unit 104.

Here, the communication unit 102 includes, for example, an IEEE 802.15.1 port and a transceiving circuit, an IEEE802.11 port and a transceiving circuit, or the like. For example, the communication unit 102 is configured with one communication module that can transmit a signal at a plurality of transmission power levels or a plurality of communication modules that differ in transmission power for transmitting a signal.

The control unit 104 is configured with, for example, an MPU or the like and has a function of controlling the processing device 100 in general. The control unit 104 includes, for example, a processing unit 110 and has a function of performing the process related to the processing method according to the present embodiment in an initiative manner.

The processing unit 110 has a function of performing the process related to the processing method according to the present embodiment in an initiative manner. The processing unit 110 performs the authentication process of authenticating the communication target device through the communication of the first communication range, and performs the communication-based process with the authenticated communication target device through the communication of the second communication range.

More specifically, the processing unit 110 performs, for example, the process described in [1-1] or the process described in [2-2].

The control unit 104 actively performs the processing of the processing method according to the present embodiment by including the processing unit 110, for example.

The processing device 100 may perform processing of the processing method related to the present embodiment according to, for example, the configuration illustrated in FIG. 6.

Accordingly, the processing device 100 may improve user convenience according to, for example, the configuration illustrated in FIG. 6.

In addition, the processing device 100 may achieve the effect obtained by performing the processing of the processing method according to the present embodiment, as described above, for example, according to the configuration illustrated in FIG. 6.

The configuration of the processing device according to the embodiment is not limited to the configuration illustrated in FIG. 6.

For example, the processing device according to the present embodiment may include the processing unit 110 separately from the control unit 104 (for example, can implement the processing unit 110 through a separate processing circuit). The processing device according to the present embodiment may have a configuration in which the process in the processing unit 110 is performed by a plurality of processing circuits.

When communication with an external device via an external communication device having the same function and configuration as the communication unit 102, for example, is performed, the processing device according to the embodiment may not include the communication unit 102.

[II] Information Processing Method According to Present Embodiment

Figure 8:
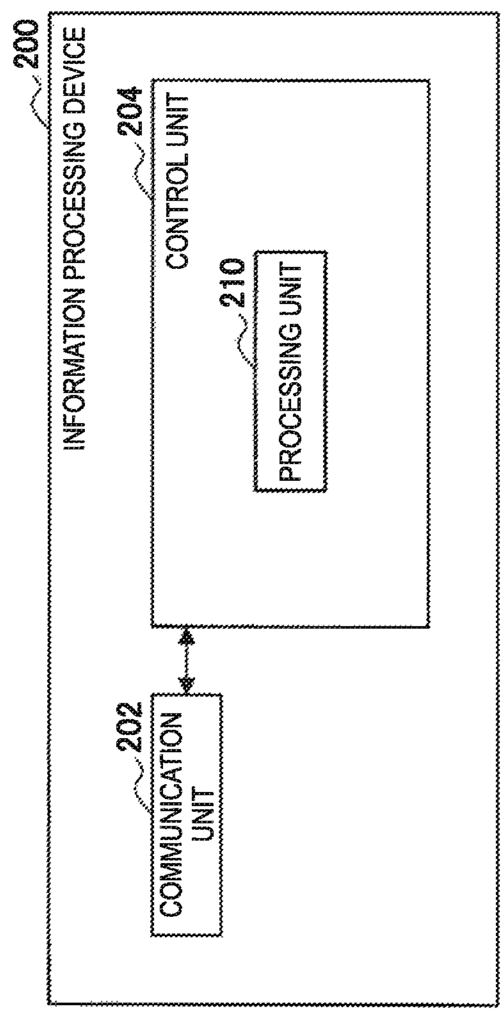
FIG. 8 is a block diagram illustrating an example of a configuration of an information processing device according to the present embodiment.

FIG. 8 is a block diagram illustrating an example of the configuration of the information processing device 200 according to the embodiment. The information processing device 200 includes, for example, a communication unit 202, and a control unit 204.

The information processing device 200 may include, for example, a ROM (not shown), a RAM (not shown), a storage unit (not shown), an operation unit (not shown) that may be manipulated by the user, a display unit (not shown) displaying various images on a display screen, etc. The information processing device 200 connects the aforementioned components, for example, using a bus as a data transfer path.

The ROM (not shown) stores data for control, such as programs and operation parameters used by the control unit 204. The RAM (not shown) temporarily stores a program executed by the control unit 204.

The storage unit (not shown) is a storage means included in the information processing device 200 and stores, for example, system softwares such as an operating system, or data such as various applications. Here, as the storage unit (not shown), for example, a magnetic recording medium such as a hard disk, a nonvolatile memory such as a flash memory or the like may be exemplified. In addition, the storage unit (not shown) may be attachable to/detachable from the information processing device 200.

As the operation unit (not shown), an operation input device which will be described later may be exemplified. As the display unit (not shown), a display device which will be described later may be exemplified.

[Hardware Configuration of Information Processing Device 200]

The information processing device 200 has, for example, a hardware configuration (including modified example) similar to that of the processing device 100 illustrated in FIG. 7. It will be appreciated that the hardware configuration of the information processing device 200 is not limited to the above-described example.

The communication unit 202 is a communication unit with which the information processing device 200 is equipped, and performs communication with the external device such as the information processing device according to the present embodiment, for example, through the communication of the first communication range (the communication of the first communication distance) or the communication of the second communication range (the communication of the second communication distance). The communication of the communication unit 202 is controlled by, for example, the control unit 204.

Here, the communication unit 202 includes, for example, an IEEE 802.15.1 port and a transceiving circuit, an IEEE802.11 port and a transceiving circuit, or the like. For example, the communication unit 202 is configured with a communication device of a communication scheme corresponding to the communication unit 102 with which the processing device 100 illustrated in FIG. 6 is equipped (or the external communication device connected to the processing device 100).

The control unit 204 is configured with, for example, an MPU or the like and has a function of controlling the information processing device 200 in general. The control unit 204 includes, for example, a processing unit 210 and has a function of performing the process in the information processing method according to the present embodiment in an initiative manner.

The processing unit 210 has a function of performing the process in the information processing method according to the present embodiment in an initiative manner. The processing unit 210 performs the authentication process of authenticating the processing device through the communication of the first communication range with the processing device that is performing the communication of the first communication range, and performs the communication-based process with the authenticated processing device through the communication of the second communication range switched from the communication of the first communication range in the processing device.

More specifically, the processing unit 210 performs, for example, the process described in [1-2] or the process described in [2-3].

The control unit 204 includes, for example, the processing unit 210 and performs the process in the information processing method according to the present embodiment in an initiative manner.

The information processing device 200 performs the process in the information processing method according to the present embodiment through, for example, the configuration illustrated in FIG. 8.

Thus, the information processing device 200 can improve the convenience of the user through, for example, the configuration illustrated in FIG. 8.

Further, for example, the information processing device 200 can implement, for example, the effects obtained by performing the process in the information processing method according to the present embodiment through the configuration illustrated in FIG. 8.

The configuration of the information processing device according to the present embodiment is not limited to the configuration illustrated in FIG. 8.

For example, the information processing device according to the present embodiment may include the processing unit 210 separately from the control unit 204 (for example, can implement the processing unit 210 through a separate processing circuit). The processing device according to the present embodiment may have a configuration in which the process in the processing unit 210 is performed by a plurality of processing circuits.

Further, for example, when communication with an external device is performed through an external communication device having a similar function and configuration to those of the communication unit 202, the information processing device according to the present embodiment may not include the communication unit 202.

The processing device has been described as an example of a component constituting the information processing system according to the present embodiment, but the present embodiment is not limited to this example. For example, the present embodiment can be applied to various devices that can be applicable to an information processing system related to provision of a service or the like corresponding to the communication-based process according to the present embodiment such as the ticket gate illustrated in FIG. 1 or the like, a device installed in a store or the like (for example, a device related to a point of sale (POS) or the like), or a computer such as a personal computer (PC) or a server. For example, the present embodiment can be applied to a processing IC that can be incorporated into the above-described device or the like.

Further, the information processing device has been described as an example of a component constituting the information processing system according to the present embodiment, but the present embodiment is not limited to this example. For example the present embodiment can be applied to various devices such as a communication device such as a smart phone or a mobile phone illustrated in FIG. 1, a tablet type device, a computer such as a PC, a video/audio reproducing device (or a video/audio recording/reproducing device), or a game machine. For example, the present embodiment can be applied to a processing IC that can be incorporated into the above-described device or the like.

Further, the distributed management device has been described as an example of a component constituting the information processing system according to the present embodiment, but the present embodiment is not limited to this example. For example, the present embodiment can be applied to various devices that can be applicable to an information processing system related to provision of a service or the like corresponding to the communication-based process according to the present embodiment such as the ticket gate illustrated in FIG. 1 or a computer such as a server.

Further, the central management device has been described as an example of a component constituting the information processing system according to the present embodiment, but the present embodiment is not limited to this example. For example, the present embodiment can be applied to various devices that can be applicable to an information processing system related to provision of a service or the like corresponding to the communication-based process according to the present embodiment such as a computer such as a server.

(Program According to Present Embodiment)

[i] Program for Implementing Processing Device According to the Present Embodiment When a program causing a computer to function as the processing device according to the present embodiment (for example, a program capable of performing the process related to the processing method according to the present embodiment) is executed by a processor or the like in a computer, the convenience for the user can be improved. When the program causing the computer to function as the processing device according to the present embodiment is executed by a processor or the like in a computer, the information processing system capable of improving the convenience for the user by performing the process in the information processing method according to the present embodiment is implemented.

In addition, a program for enabling a computer to function as the processing device according to the embodiment may be executed by a processor in the computer to achieve the effects obtained by processing of the aforementioned information processing method according to the present embodiment.

[ii] Program for Implementing Information Processing Device According to Present Embodiment When a program causing a computer to function as the information processing device according to the present embodiment (for example, a program capable of performing the process related to the processing method according to the present embodiment in the information processing device according to the present embodiment) is executed by a processor or the like in a computer, the convenience for the user can be improved. When the program causing the computer to function as the information processing device according to the present embodiment is executed by a processor or the like in a computer, the information processing system capable of improving the convenience for the user by performing the process in the information processing method according to the present embodiment is implemented.

Moreover, when a program that causes a computer to function as the information processing device according to the present embodiment is executed by a processor or the like in the computer, it is possible to provide an effect provided by the processing related to the information processing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while the programs (computer programs) for enabling a computer to function as the information processing device according to the embodiment and the information processing device according to the embodiment are provided in the above description, the present embodiment may provide recording media storing the programs separately or a recording medium storing the programs together.

The above-described configurations express examples of the embodiment and, of course, pertain to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A processing device, including:

a processing unit configured to perform an authentication process of authenticating a communication target device through communication of a first communication distance and perform a communication-based process with the authenticated communication target device through communication of a second communication distance shorter than the first communication distance.

(2)

The processing device according to (1), wherein the processing unit determines whether or not the communication target device is located within the second communication distance, and when the communication of the first communication distance is performed and the communication target device is determined to be located within the second communication distance, switches a communication distance from the first communication distance to the second communication distance.

(3)

The processing device according to (2), wherein the processing unit determines whether or not the communication target device is located within the second communication distance based on a detection result of a signal strength of a signal transmitted from the communication target device.

(4)

The processing device according to (2) or (3), wherein the processing unit determines whether or not the communication target device is located within the second communication distance based on a detection result of a sensor that detects an object.

(5)

The processing device according to any one of (1) to (4), wherein the processing unit refrains from performing communication with the communication target device when the communication target device is determined to be performing communication with another predetermined processing device.

(6)

The processing device according to (5), wherein the processing unit determines whether or not the communication target device is performing the communication with the other predetermined processing device based on connection information indicating a communication state corresponding to the communication target device which is acquired from an external device.

(7)

The processing device according to any one of (1) to (6), wherein the processing unit disconnects communication with the communication target device which is being performed when disconnection information which corresponds to the communication target device and is used for disconnecting communication which is being performed is acquired from an external device.

(8)

The processing device according to any one of (1) to (7), wherein the processing unit performs a secure process through the communication of the second communication distance.

(9)

The processing device according to any one of (1) to (8), further including:

a communication unit configured to perform communication with an external device through the communication of the first communication distance or the communication of the second communication distance.

(10)

An information processing device, including:

a processing unit configured to perform an authentication process of authenticating a processing device that performs communication of a first communication distance through the communication of the first communication distance with the processing device and perform a communication-based process with the authenticated processing device through communication of a second communication distance shorter than the first communication distance switched from the communication of the first communication distance in the processing device.

(11)

The information processing device according to (10), wherein the processing unit authenticates each of a plurality of processing devices that perform the communication of the first communication distance through the communication of the first communication distance with each of the plurality of processing devices.

(12)

The information processing device according to (11), wherein, when a process by the communication of the second communication distance with one of the plurality of authenticated processing devices is started, communication with other processing devices among the plurality of authenticated processing devices is disconnected.

(13)

The information processing device according to (12), wherein the processing unit sequentially disconnects communication in a predetermined order based on an estimated distance from the processing device when the communication with the other processing devices is disconnected.

(14)

The information processing device according to (12), wherein the processing unit disconnects the communication with the other processing devices in a synchronous manner when the communication with the other processing devices is disconnected.

(15)

The information processing device according to any one of (10) to (14), further including:

a communication unit configured to perform communication with an external device through the communication of the first communication distance or the communication of the second communication distance.

(16)

An information processing system, including:

a processing device; and an information processing device configured to perform communication with the processing device, wherein the processing device includes a processing unit configured to perform an authentication process of authenticating the information processing device of a communication target through communication of a first communication distance and perform a communication-based process with the authenticated information processing device through communication of a second communication distance shorter than the first communication distance, and the information processing device includes a processing unit configured to perform an authentication process of authenticating the processing device through the communication of the first communication distance and perform a communication-based process with the authenticated processing device through the communication of the second communication distance switched from the communication of the first communication distance in the processing device.

(17)

A processing method performed in a processing device, including:

a step of performing an authentication process of authenticating a communication target device through communication of a first communication distance; and a step of performing a communication-based process with the authenticated communication target device through communication of a second communication distance shorter than the first communication distance.

(18)

An information processing method performed in an information processing device, including:

a step of performing an authentication process of authenticating a processing device that performs communication of a first communication distance through the communication of the first communication distance with the processing device; and a step of performing a communication-based process with the authenticated processing device through communication of a second communication distance shorter than the first communication distance switched from the communication of the first communication distance in the processing device.

(19)

An information processing method performed in an information processing system including a processing device that performs communication of a first communication distance and an information processing device, the information processing method including:

a step of performing, by the processing device and the information processing device, mutual authentication through the communication of the first communication distance; and a step of switching, by the processing device, communication from the communication of the first communication distance to communication of a second communication distance shorter than the first communication distance and performing, by the processing device and the information processing device, a communication-based process through the communication of the second communication distance.

REFERENCE SIGNS LIST

100, 100A, 100B, 100C, 100D, 100E, 100F, 100G, 100H, 100I processing device

102, 202 communication unit

104, 204 control unit

110, 210 processing unit

200 information processing device

300, 300A, 300B, 300C distributed management device

400 central management device

1000, 2000 information processing system

The invention claimed is:

1. A processing system including a plurality of processing devices, each processing device comprising:

a processing unit configured to perform an authentication process of authenticating a communication target device through communication of a first communication distance that is initiated based on an advertisement of an identifier transmitted from the processing unit at predetermined intervals, wherein a selected processing device among the plurality of processing devices is selected to perform a communication-based process with the authenticated communication target device through communication of a second communication distance shorter than the first communication distance, wherein communication of the authenticated communication target device with each processing device other than the selected processing device is sequentially disconnected in a predetermined order based on an estimated distance of the authenticated communication target device from each processing device, and wherein the processing unit is implemented via at least one processor.

2. The processing system according to claim 1, wherein the processing unit of each processing device determines whether or not the communication target device is located within the second communication distance, and wherein, when the communication of the first communication distance is performed and the communication target device is determined to be located within the second communication distance, the processing unit of the selected processing device switches a communication distance from the first communication distance to the second communication distance.

3. The processing system according to claim 2, wherein the processing unit determines whether or not the communication target device is located within the second communication distance based on a detection result of a signal strength of a signal transmitted from the communication target device.

4. The processing system according to claim 2, wherein the processing unit determines whether or not the communication target device is located within the second communication distance based on a detection result of a sensor that detects an object.

5. The processing system according to claim 1, wherein the processing unit refrains from performing communication with the communication target device when the communication target device is determined to be performing communication with another predetermined processing device.

6. The processing system according to claim 5, wherein the processing unit determines whether or not the communication target device is performing the communication with the other predetermined processing device based on connection information indicating a communication state corresponding to the communication target device which is acquired from an external device.

7. The processing system according to claim 1, wherein the processing unit disconnects communication with the communication target device which is being performed when disconnection information which corresponds to the communication target device and is used for disconnecting communication which is being performed is acquired from an external device.

8. The processing system according to claim 1, wherein the processing unit performs a secure process through the communication of the second communication distance.

9. The processing system according to claim 1, each processing device further comprising:

a communication unit configured to perform communication with an external device through the communication of the first communication distance or the communication of the second communication distance, wherein the communication unit is implemented via at least one processor.

10. The processing system according to claim 1, wherein, when the selected processing device among the plurality of processing devices performs the communication-based process with the authenticated communication target device through the communication of the second communication distance, the communication of the authenticated communication target device with each other processing device is disconnected.

11. The processing system according to claim 1, wherein the communication of the first communication distance establishes a connection of a BLE layer before performing the authentication process.

12. An information processing device, comprising:

a processing unit configured to perform an authentication process of authenticating each of a plurality of processing devices that perform communication of a first communication distance through the communication of the first communication distance with each of the plurality of processing devices, wherein the communication of the first communication distance is initiated based on an advertisement of an identifier transmitted from each processing device at predetermined intervals, and perform a communication-based process with a selected processing device among the plurality of authenticated processing devices through communication of a second communication distance shorter than the first communication distance switched from the communication of the first communication distance in the selected processing device, wherein the processing unit sequentially disconnects the communication with each processing device other than the selected processing device in a predetermined order based on an estimated distance from each processing device, and wherein the processing unit is implemented via at least one processor.

13. The information processing device according to claim 12, wherein the communication with each other processing device is disconnected when the communication-based process through the communication of the second communication distance with the selected processing device among the plurality of authenticated processing devices is started.

14. The information processing device according to claim 13, wherein the processing unit disconnects the communication with each other processing device in a synchronous manner when the communication with each other processing device is disconnected.

15. The information processing device according to claim 12, further comprising:

a communication unit configured to perform communication with an external device through the communication of the first communication distance or the communication of the second communication distance, wherein the communication unit is implemented via at least one processor.

16. An information processing system, comprising:

a plurality of processing devices; and an information processing device configured to perform communication with each of the plurality of processing devices, wherein each processing device of the plurality of processing devices includes a processing unit configured to perform an authentication process of authenticating the information processing device through communication of a first communication distance that is initiated based on an advertisement of an identifier transmitted from the processing unit at predetermined intervals, wherein a selected processing device among the plurality of processing devices is selected to perform a communication-based process with the authenticated information processing device through communication of a second communication distance shorter than the first communication distance, wherein the information processing device includes a processing unit configured to perform an authentication process of authenticating each of the plurality of processing devices through the communication of the first communication distance and perform a communication-based process with the selected processing device among the plurality of authenticated processing devices through the communication of the second communication distance switched from the communication of the first communication distance in the processing device, wherein the processing unit sequentially disconnects the communication with each processing device other than the selected processing device in a predetermined order based on an estimated distance from each processing device, and wherein the processing unit of each processing device and the processing unit of the information processing device are each implemented via at least one processor.

17. A processing method performed in a processing system including a plurality of processing devices, the method comprising:

performing, by each processing device of the plurality of processing devices, an authentication process of authenticating a communication target device through communication of a first communication distance that is initiated based on an advertisement of an identifier transmitted from each processing device at predetermined intervals; and performing, by a selected processing device among the plurality of processing devices, a communication-based process with the authenticated communication target device through communication of a second communication distance shorter than the first communication distance, wherein the communication of the authenticated communication target device with each processing device other than the selected processing device is sequentially disconnected in a predetermined order based on an estimated distance of the authenticated communication target device from each processing device.

18. An information processing method performed in an information processing device, comprising:

performing an authentication process of authenticating a plurality of processing devices that perform communication of a first communication distance through the communication of the first communication distance with each processing device, wherein the communication of the first communication distance is initiated based on an advertisement of an identifier transmitted from each processing device at predetermined intervals; and performing a communication-based process with a selected processing device among the plurality of authenticated processing devices through communication of a second communication distance shorter than the first communication distance switched from the communication of the first communication distance in the selected processing device, wherein the information processing device sequentially disconnects communication with each processing device other than the selected processing device in a predetermined order based on an estimated distance from each processing device.

19. An information processing method performed in an information processing system including a plurality of processing devices that perform communication of a first communication distance and an information processing device, the information processing method comprising:

performing, between each processing device of the plurality of processing devices and the information processing device, mutual authentication through the communication of the first communication distance, wherein the communication of the first communication distance is initiated based on an advertisement of an identifier transmitted from each processing device at predetermined intervals; and switching, by a selected processing device among the plurality of processing devices, communication from the communication of the first communication distance to communication of a second communication distance shorter than the first communication distance and performing, between the selected processing device and the information processing device, a communication-based process through the communication of the second communication distance, wherein the information processing device sequentially disconnects communication with each processing device other than the selected processing device in a predetermined order based on an estimated distance from each processing device.

* * * * *